(12) United States Patent
Hardie

(10) Patent No.: US 8,379,526 B2
(45) Date of Patent: Feb. 19, 2013

(54) AUTOMATIC DETECTION AND PROCESSING OF ASYNCHRONOUS DATA FOR BANDWIDTH REDUCTION

(75) Inventor: Tony Hardie, Union City, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 1041 days.

(21) Appl. No.: 11/143,870

(22) Filed: Jun. 1, 2005

(65) Prior Publication Data

US 2006/0277292 A1      Dec. 7, 2006

(51) Int. Cl.
*G01R 31/08*      (2006.01)
(52) U.S. Cl. ........................................ 370/236
(58) Field of Classification Search .............. 370/236, 370/230.1, 235, 352, 395.2, 395.21, 465, 370/466, 477, 501, 503, 507, 508
See application file for complete search history.

(56) References Cited

U.S. PATENT DOCUMENTS

| | | | |
|---|---|---|---|
| 5,963,564 A * | 10/1999 | Petersen et al. | 370/503 |
| 6,292,496 B1 * | 9/2001 | Rasanen | 370/503 |
| 7,260,654 B1 * | 8/2007 | Satapathy et al. | 709/250 |
| 7,324,516 B2 * | 1/2008 | Daniel et al. | 370/392 |
| 7,577,740 B2 * | 8/2009 | Kuhn et al. | 709/225 |
| 2003/0037297 A1 * | 2/2003 | Araki | 714/746 |
| 2003/0053486 A1 * | 3/2003 | Okamori | 370/474 |

* cited by examiner

*Primary Examiner* — Mark Rinehart
*Assistant Examiner* — Peter Cheng

(57) ABSTRACT

The present invention relates to methods, apparatuses, and systems for relaying data involving obtaining a data stream from a data source, forwarding the obtained data stream over a network, while forwarding the obtained data stream over the network, monitoring the obtained data stream to detect a data transfer mode associated with inclusion of synchronization characters in the obtained data stream, and if the data transfer mode is detected, removing a plurality of synchronization characters from the obtained data stream to produce a bandwidth-reduced data stream and forwarding the bandwidth-reduced data stream instead of the obtained data stream over the network. Synchronization characters may comprise start bits, stop bits, and idle bits. The data transfer mode may be an asynchronous data transfer mode based on a V.14 standard. Also, the asynchronous data transfer mode may be detected by decoding a predetermined number of valid V.14 frames from the obtained data stream.

18 Claims, 4 Drawing Sheets

AUTOMATIC DETECTION AND PROCESSING OF ASYNCHRONOUS DATA FOR BANDWIDTH REDUCTION

BACKGROUND OF THE INVENTION

FIG. 1 is a diagram of an illustrative system 100 for relaying data over a network according to one embodiment of the present invention. As shown in the figure, system 100 includes a network relay device 102 communicating with another network relay device 104 over a network 106. Network 106 may be a packet-switched network and/or a circuit-switched network. For example, a packet-switched network may comprise a local area network (LAN), a wireless local area network (WLAN), a wide area network (WAN), a network of networks, etc. One commonly-known packet-switched network is the Internet. A circuit-switched network may comprise a simple wired or wireless connection, a modem "dial-up" connection, a digital subscriber line (DSL), etc. Use of network 106 may also involve layers of network communications. For example, one configuration of layers of network communication may involve a physical layer, a data-link layer, a network layer, a transport layer, a session layer, a presentation layer, an application layer, etc. Regardless of the specific implementation of network 106, network relay device 102 and network relay device 104 are capable of forwarding data to one another over network 106. Further, in the present embodiment of the invention, network relay device 102 and network relay device 104 are capable of bi-directional communication.

As shown in FIG. 1, system 100 further includes one or more data communication devices such as 110, 112, and 114 coupled to network relay device 102. System 100 also includes one or more data communication devices such as 120, 122, and 124 coupled to network relay devices 104. These data communication devices may be different types of data equipment, such as telephones, fax machines, text messaging devices, etc. The illustrative arrangement shown in FIG. 1 allows numerous end-to-end communication links to be established. Each communication link may be bi-directional in nature and be established between two different data communication devices.

Just as an example, a first user at telephone 112 may establish a "call" with a second user at telephone 122. The following briefly describes communication of the "call" in one direction. The first user's voice may be received at a receiver at telephone 112, converted into digital data, and sent to network relay device 102. This data, which represents the first caller's voice, may be forwarded from network relay device 102 to network relay device 104. The forwarded data may then be sent to telephone 122, reconstructed into sound, and outputted at telephone 122 to be heard by the second user. The conversion of voice signals into digital data format, and vice versa, may be implemented using conventional techniques known to one of skill in the art. Also, known techniques for voice data compression, encoding, encryption, and other processing may be implemented.

Communication of the "call" in the other direction operates in a similar manner. That is, the voice of the second caller is received at telephone 122, data representing the second caller's voice is forwarded from network relay device 104 to network relay device 102, and the corresponding signal is sent to telephone 112. Finally, the second caller's voice is reconstructed into sound that is output at telephone 112. In certain embodiments, a "call" such as that described above is established over network 106 that is implemented as an IP network, and the "call" may be referred to as a voice-over-IP (VoIP) call. In one specific embodiment, the call may be a secure voice call.

Different types of data transfer modes may be implemented by equipment such as data communication devices 110, 112, 114, 120, 122, and 124. Typically, a data transfer mode relates to a particular set of conventions that devices follow in communicating data with one another. Such data transfer modes may correspond to standard communication interfaces. Examples of data transfer modes include synchronous modes and asynchronous modes.

Generally speaking, a synchronous mode utilizes both data signals and clock signals. For example, a data signal may carry a data waveform representing the logical ones and zeros of the data being transferred. A corresponding clock signal may provide a clock waveform that provides the timing for deciding the appropriate moments in time to sample the data waveform, in order to obtain the data. Different manners of implementing a data signal and a corresponding clock signal may be used. Just as a simple example, a data signal may be sampled on every rising edge of a corresponding clock signal. Other techniques and details for implementing data signals and clock signals are well-known to one of skill in the art.

By contrast, an asynchronous mode typically utilizes data signals, but not clock signals. For example, a data signal may carry a data waveform representing the logical ones and zeros that of the data being transferred. In addition to the actual data that represents, for instance, a user's voice, an asynchronous interface may also insert additional data, referred to as "synchronization characters" into the transmission to help maintain the structure of data within the transmission. For example, an asynchronous interface may organize original data that is to be transmitted into "frames." A frame may be of a fixed size, such as 8 bits long. Synchronization characters may then be inserted to properly demarcate the beginning and end of frames. For instance, a "start bit" may be inserted at the beginning of each frame. Also, a "stop bit" may be inserted at the end of each frame. In addition, when no data is available to be transmitted, a sufficient number of "idle bits" may be inserted between valid frames of data.

One well-known example of an asynchronous interface standard is the Comité Consultatif International Téléphonique et Télégraphique (CCITT), or Telecommunication Standardization Sector of the International Telecommunications Union (ITU), Recommendation V.14 standard ("V.14 standard"). According to a generally accepted V.14 standard, asynchronous data transmission may be implemented by organizing data into frames, and inserting a "start bit" having a value of "1" before each frame, inserting a "stop bit" having a value of "0" after each frame, and inserting one or more "idle bits" having values of "1" between frames when no data is available to be transmitted. Specifically, the "idle bits" may be inserted after the "stop bit" of a particular frame and before the "start bit" of the next frame.

The transfer of data between a data communication device such as device 112 and a network relay device such as device 102, depicted in FIG. 1, may not necessarily involve the actual data signals and/or clock signals mentioned above. Nevertheless, the data that is transferred between such devices may include synchronization characters, if an asynchronous mode is utilized at some point in the path of transmission.

For example, as shown in FIG. 1, data communication device 112 and network relay device 102 communicate by sending modulated signals to one another. Various modulation schemes such as amplitude modulation, phase modulation, frequency modulation, and others may be adopted as is well-known to one of skill in the art. Such modulation schemes may utilize "symbols" that may each represent one or more bits. The number of bits represented by each symbol depends on the modulation scheme used. For instance, if a quadrature phase shift keying (QPSK) modulation scheme is used, or if a quadrature amplitude modulation (QAM) scheme is used, four bits would be represented by each symbol. While such modulated communications may not necessarily involve asynchronous or synchronous interface signals such as separate data signals and/or clock signals, the data represented by the communicated symbols may include synchronization characters that are present as result of the operation of an asynchronous data transfer mode by a data communication device.

Thus, if a data communication device 112 is operating in asynchronous mode, the modulated symbols that data communication device 112 sends to a network relay device 102 may include synchronization characters such as start bits, stop bits, and idle bits. Data communication device such as device 122 operating in asynchronous mode at the other end of the communication link may also be expecting such synchronization characters. In typical prior art systems, network relay device 102 would simply forward actual data, along with the synchronization characters, to network relay device 104. Network relay device 104 would then send the actual data, along with the synchronization characters, to data communication device 122. Again, this may be done by using modulated communications as described above.

As demands on network bandwidth increase, there is an ever greater need to improve the efficiency of data transmission over paths such as network 106. If a system such as system 100 can be capable of reducing the bandwidth requirements of data forwarded over network 106, efficiency can be correspondingly improved. However, prior art systems have not adequately addressed the reduction of bandwidth requirements for data such as that involved in the operation of an asynchronous data transfer mode. Thus, there is a significant need for workable techniques that allow more efficient transmission of data over networks.

BRIEF SUMMARY OF THE INVENTION

The present invention relates to methods, apparatuses, and systems for relaying data involving obtaining a data stream from a data source, forwarding the obtained data stream over a network, while forwarding the obtained data stream over the network, monitoring the obtained data stream to detect a data transfer mode associated with inclusion of synchronization characters in the obtained data stream, and if the data transfer mode is detected, removing a plurality of synchronization characters from the obtained data stream to produce a bandwidth-reduced data stream and forwarding the bandwidth-reduced data stream instead of the obtained data stream over the network.

A first control message may be sent, if the data transfer mode is detected. Also, a second control message may be sent, and the obtained data stream may be forwarded over the network instead of the bandwidth-reduced data stream, if the data transfer mode is no longer detected. The first control message and second control message may be included as part of data streams forwarded over the network.

The synchronization characters may comprise start bits, stop bits, and idle bits. The data transfer mode associated with inclusion of synchronization characters may be an asynchronous data transfer mode. The asynchronous data transfer mode may be based on a V.14 standard. Also, the asynchronous data transfer mode may be detected by decoding a predetermined number of valid V.14 frames from the obtained data stream.

The invention may also relate to methods, apparatuses, and systems for relaying data involving receiving a data stream forwarded over a network, receiving at least one control message forwarded over the network, transmitting the received data stream to a data destination, and if a first control message is received, inserting a plurality of synchronization characters in the received data stream to produce a reconstituted data stream and transmitting the reconstituted data stream instead of the received data stream to the data destination.

The received data stream may be transmitted to the data destination instead of the reconstituted data stream, if a second control message is received. Also, the at least one control stream may be received as part of the received data stream.

DETAILED DESCRIPTION OF THE INVENTION

Overview

According to one embodiment of the present invention, a network relay device such as device 102 is capable of automatically detecting data organized according to an asynchronous mode. Upon detection of the asynchronous mode, the network relay device is capable of removing synchronization characters such as start bits, stop bits, and idle bits from the data. By removing such extraneous bits, the data that is to be forwarded is effectively reduced in size. In other words, bandwidth-reduced data is produced. The network relay device may then forward the bandwidth-reduced data over a network such as network 106. The bandwidth-reduced data is received by another network relay device such as device 104.

In addition to the bandwidth-reduced data, network relay device 102 may also send a control message to network relay device 104, to indicate the bandwidth-reduced status of the forwarded data. In other words, the message indicates to network relay device 104 that synchronization characters have been removed from the bandwidth-reduced data. In one embodiment of the invention, such a message is sent as a part of the forwarded data. That is, the bandwidth-reduced data that is forwarded over network 106 may be depleted of synchronization characters but may be inserted with one or more control messages. Because synchronization characters can be associated with each frame and thus occur relatively frequently, where as control messages occur relatively infrequently, the expected overall effect of the removal of synchronization characters and insertion of control messages is a significant reduction in the amount of data that is needed to be forwarded over network 106.

Upon receiving the control message, network relay device 104 may respond by re-inserting appropriate synchronization characters into the received bandwidth-reduced data, before passing the data to a data communication device such as device 122. This procedure may be necessary if data communication device 122 is operating in asynchronous mode, and is therefore expecting synchronization characters to be present in the data it receives. Accordingly, synchronization characters may be removed before forwarding of data over network 106 to reduce bandwidth consumption and improve efficiency, yet a data communication device receiving the data while operating in asynchronous mode may still be able to receive data that contains appropriate synchronization characters.

Data Received From Source Data Communication Device

Figure 1:
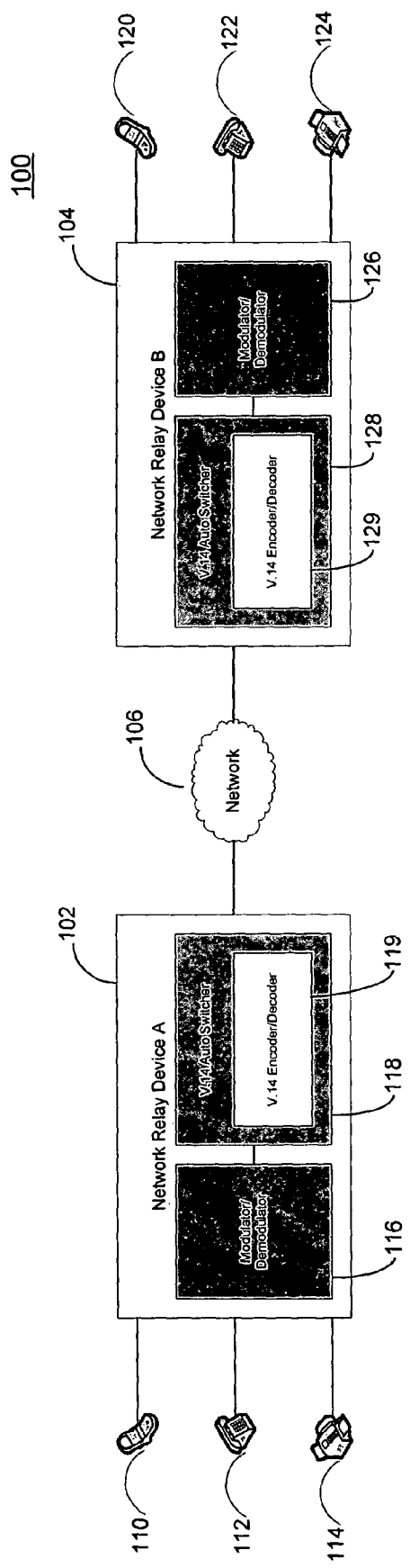
FIG. 1 is a diagram of an illustrative system for relaying data over a network according to one embodiment of the present invention.

Referring again to FIG. 1, equipment for performing techniques according to the present embodiment of the invention are described in further detail below. Network relay device 102 comprises a modulator/demodulator module 116 and a V.14 auto switcher 118. V.14 auto switcher 128 in turn comprises a V.14 encoder/decoder module 119. Network relay device 104 has a similar structure and comprises a modulator/demodulator module 126 and a V.14 auto switcher 128. V.14 auto switcher 128 in turn comprises a V.14 encoder/decoder module 129.

Figure 2:
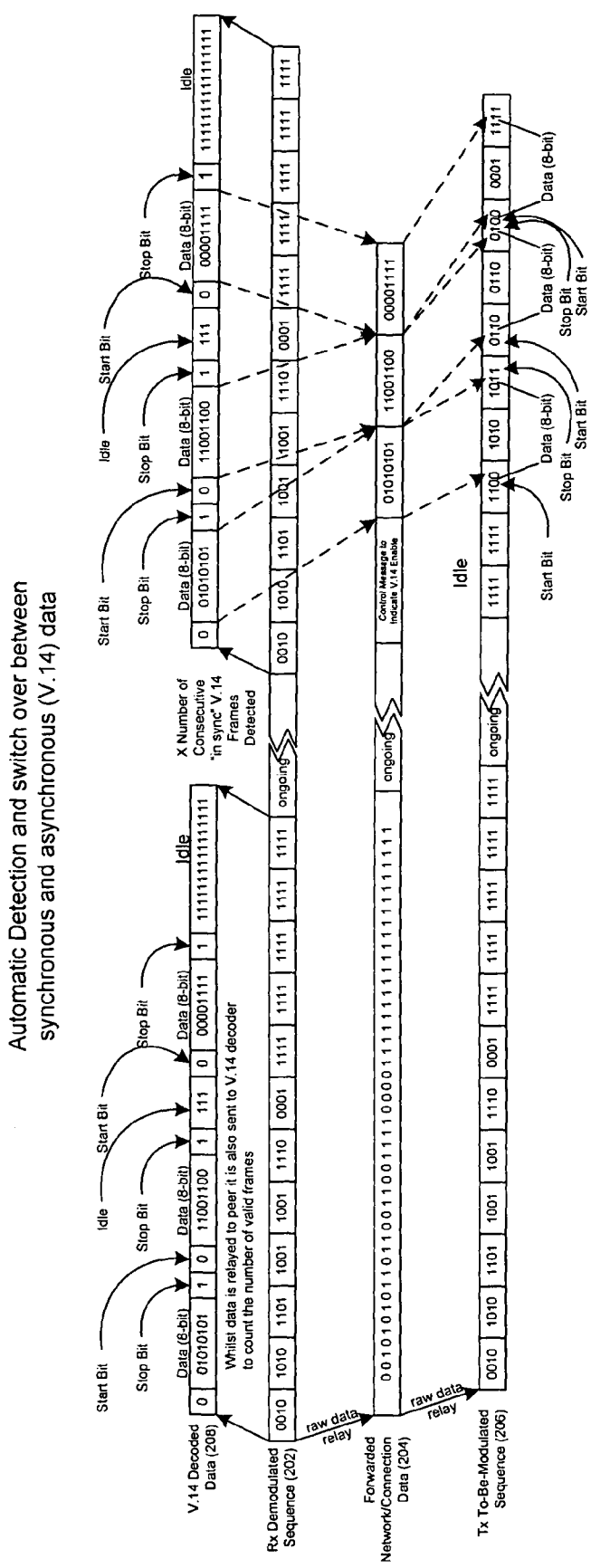
FIG. 2 presents illustrative data sequences as processed by network relay devices and forwarded over a network according to one embodiment of the present invention.

FIG. 2 presents illustrative data sequences as processed by network relay devices 102 and 104 and forwarded over network 106 according to one embodiment of the present invention. For clarity of illustration, the figure depicts processing associated with data travel in one direction, from data communication device 112 to data communication device 122.

In terms of the example mentioned previously, a first user at data communication device 112 (e.g., a telephone) may establish a "call" with a second user at data communication device 122 (e.g., another telephone). The travel of data in one direction may represent the transmission of the first user's "voice" from data communication device 112 to data communication device 122. The first user's voice may be received at a receiver at data communication device 112, converted into digital data, and sent to network relay device 102. Here, the digital data is transmitted as a modulated signal from data communication device 112 to network relay device 102. This modulated signal is received by modulator/demodulator module 116.

As depicted, network relay device 102 uses modulator/demodulator module 116 for its demodulation capabilities. Thus, modulator/demodulator 116 demodulates the modulated signal according to the appropriate modulation scheme, to produce RX demodulated sequence 202. RX demodulated sequence 202 is shown as being organized into groups of four bits each. This reflects a modulation scheme used in the present embodiment of the invention in which each symbol represents four data bits. In other words, each group of four bits is demodulated from a corresponding symbol in the modulated signal received from data communication device 112.

Detection of Asynchronous Data Transfer Mode

RX demodulated sequence 202 is forwarded from modulator/demodulator module 116 to V.14 auto switcher 118. V.14 auto switcher 118 is capable of automatically detecting a data transfer mode associated with inclusion of synchronization characters. In this case, V.14 auto switcher 118 is configured to detect patterns in RX demodulated sequence 202 that indicate the use of a V.14 asynchronous data transfer mode. One technique for detecting V.14 asynchronous data transfer mode in accordance with the present embodiment of the invention is described below. However, variations and alternative techniques may be implemented by one of ordinary skill in the art given the present disclosure.

Here, V.14 auto switcher 118 uses V.14 encoder/decoder 119 for its decoding capabilities. Specifically, V.14 encoder/decoder 119 examines RX demodulated sequence 202 in search of valid V.14 frames. This is possible because the structure of a valid V.14 frame is known. For instance, it may be known that a valid V.14 frame always begins with a "start" bit (e.g., "0"), ends with a "stop" bit (e.g., "1"), and contains eight data bits between the start bit and the stop bit. Also, it may be known that valid V.14 frames are separated by "idle" bits (e.g., "1"s).

Thus, V.14 encoder/decoder 119 may look for a start bit, and if one is found, skip eight bits and look for a stop bit. If the stop bit is also found, a possible valid frame may be declared. V.14 encoder/decoder 119 may then receive idle bits until a new start bit is found and begin identifying another valid frame. This type of testing may be performed on bit-shifted versions of RX demodulated sequence 202 to find the correct alignment of frames.

Further, V.14 encoder/decoder 119 can attempt to identify a predetermined number (X) of consecutive, valid V.14 frames. If an invalid V.14 frame is found before X consecutive, valid V.14 frames are identified, encoder/decoder 119 may choose to not declare that V.14 asynchronous mode has been detected. Instead, encoder/decoder 119 may reset its count of consecutive valid frames back to zero, and start over in attempting to find X consecutive, valid frames. On the other hand, if X consecutive, valid V.14 frames are identified, encoder/decoder 119 may declare that V.14 asynchronous mode has been detected.

In this manner, V.14 encoder/decoder 119 may detect the presence of a V.14 asynchronous data transfer mode. Upon such detection, V.14 encoder/decoder 119 becomes aware of the position of start bits, stop bits, and idle bits within the data stream. V.14 decoded data 208 represents the data sequence as viewed by V.14 encoder/decoder 119, once the positions of these synchronization characters are known.

As shown in FIG. 2, RX demodulated sequence 202 contains the same bits as V.14 decoded data 208. However, the illustrated organization of these bits are different in the two sequences. In RX demodulated sequence 202, the bits are organized according to the manner in which they are represented by corresponding symbols in the modulation signal sent from data communication device 112 to modulator/demodulator module 116—four bits per symbol. By contrast, in V.14 decoded data 208, the bits are organized according the V.14 frame structure as determined by the decoding capabilities of V.14 encoder/decoder 119—with start bits, stop bits, and idle bits appropriately identified.

According to one embodiment of the invention, V.14 auto switcher is adapted to transmit RX demodulated sequence 202 over network 106, while at the same time examine RX demodulated sequence 202 in search of valid V.14 frames. This technique ensures that forwarding of data over network 106 is not interrupted during the attempt to detect an asynchronous mode. Thus, in determining whether synchronization characters can be extracted from a data sequence to reduce its bandwidth requirements, the data sequence can continue to be forwarded over network 106. If it is determined that synchronization characters can be extracted, the extraction and associated operations are performed and the resulting reduced-bandwidth data stream is forwarded over network 106. If it is determined that synchronization characters cannot be extracted, the original data stream continues to be forwarded over network 106 without any interruption.

Removal of Synchronization Characters and Forwarding of Bandwidth-reduced Data

If a V.14 asynchronous data transfer mode is indeed detected, synchronization characters are extracted from the data stream to produce a bandwidth-reduced data stream. In the present embodiment of the invention, V.14 auto switcher 118 performs the extraction and produces the bandwidth-reduced data stream. Thus, V.14 auto switcher 118 is capable of automatically switching, from outputting RX demodulated sequence 202, to outputting the reduced-bandwidth data stream 204. The output of V.14 auto switcher 118 is produced by network relay device 102 and forwarded over network 106.

As shown in the FIG. 2, bandwidth-reduced data 204 contains the data bits found in V.14 decoded data 208, but not the start bits, stop bits, and idle bits found in V.14 decoded data 208. That is, bandwidth-reduced data 204 is shown as a data stream stripped of synchronization characters to reduce its bandwidth requirements during transmission.

According to the present embodiment of the invention, V.14 auto switcher 118 also inserts one or more control messages into bandwidth-reduced data 204. Such a control message is shown in FIG. 2. The particular control message shown in this figure indicates the bandwidth-reduced status of the forwarded data. Bandwidth-reduced data 204 is forwarded over network 106.

Re-insertion of Synchronization Characters

On the other side of this communication link, network relay device 104 receives bandwidth-reduced data 204. Specifically, V.14 auto switcher 128 examines the contents of bandwidth-reduced data 204 and identifies any control messages. When a control message is identified indicating the bandwidth-reduced status of the forwarded data 204, the forwarded data 204 is passed to V.14 encoder/decoder 129.

Here, V.14 auto switcher 128 uses V.14 encoder/decoder 129 for its encoding capabilities. Specifically, V.14 encoder/decoder 129 converts bandwidth-reduced data 204 to a V.14 asynchronous format by inserting appropriate synchronization characters. Thus, appropriate start bits, stop bits, and idle its may be inserted. In addition, any control messages found in bandwidth-reduced data 204 is also removed. The resulting reconstituted data stream is one that conforms to a proper V.14 asynchronous format. As shown in FIG. 2, the reconstituted data stream is presented as TX to-be-modulated sequence 206.

The reconstituted data stream may not contain the exact same start bits, stop bits, and idle bits as those previously removed by network relay device 102. For example, the re-insertion of synchronization characters may not begin at exactly the same bit position or even the same frame as where the removal of synchronization characters began. Such minor differences aside, the reconstituted data stream should resemble the original data stream as it appeared before removal of synchronization characters.

Data Sent to Destination Data Communication Device

TX to-be-modulated sequence 206 is sent from V.14 auto switcher 128 to modulator/demodulator module 126. In FIG. 2, the bits of TX to-be-modulated sequence 206 are shown as being organized according to symbols in a modulation signal to be sent to data communication device 122—four bits per symbol.

Although TX to-be-modulated sequence 206 shows the same general modulation scheme as that of RX demodulated sequence 202, it is possible that the alignment of symbol boundaries amongst the bits may have changed. That is, four particular bits that were represented by a common symbol in RX demodulated sequence 202 may no longer be represented by a common symbol in TX to-be-modulated sequence 206. For example, the symbol boundaries may have shifted by two bits, as shown in FIG. 2.

Nevertheless, TX to-be-modulated does include the appropriate synchronization characters such as start bits, stop bits, and idle bits that reflect the proper V.14 asynchronous mode format. V.14 auto switcher 128 forwards TX to-be-modulated sequence 206 to modulator/demodulator 126.

Here, network relay device 104 uses modulator/demodulator module 126 for its modulation capabilities. Thus, modulator/demodulator 126 modulates sequence 206 according to the appropriate modulation scheme, to produce a modulated signal. In this embodiment, each group of four bits is modulated into a corresponding symbol in the modulated signal. Network relay device 104 sends the modulated signal to data communication device 122.

In terms of the example mentioned previously, a first user at data communication device 112 (e.g., a telephone) may establish a "call" with a second user at data communication device 122 (e.g., another telephone). The travel of data in one direction may correspond to the transmission of the first user's "voice" from data communication device 112 to data communication device 122. Now, the modulated signal sent to data communication device 122 represents the first user's voice and includes appropriate synchronization characters. Thus, data communication device 122 may properly receive the modulated signal and process it to reproduce the "voice" of the first user, and present that "voice" to the second user at data communication device 122. Of course, data communication devices 112 and 122 are not necessarily restricted to be telephones. Other types of data communication equipment may be used.

The above describes an example of data travel in one direction, from data communication device 112 to data communication device 122. In bi-direction communications, similar processes may be employed at the same time for travel of data in the opposite direction, from data communication device 122 to data communication device 112. In terms of the example given above, travel of data in the opposite direction may correspond to the transmission of the second user's "voice" from data communication device 122 to data communication device 112.

Data Flow Diagram

Figure 3:
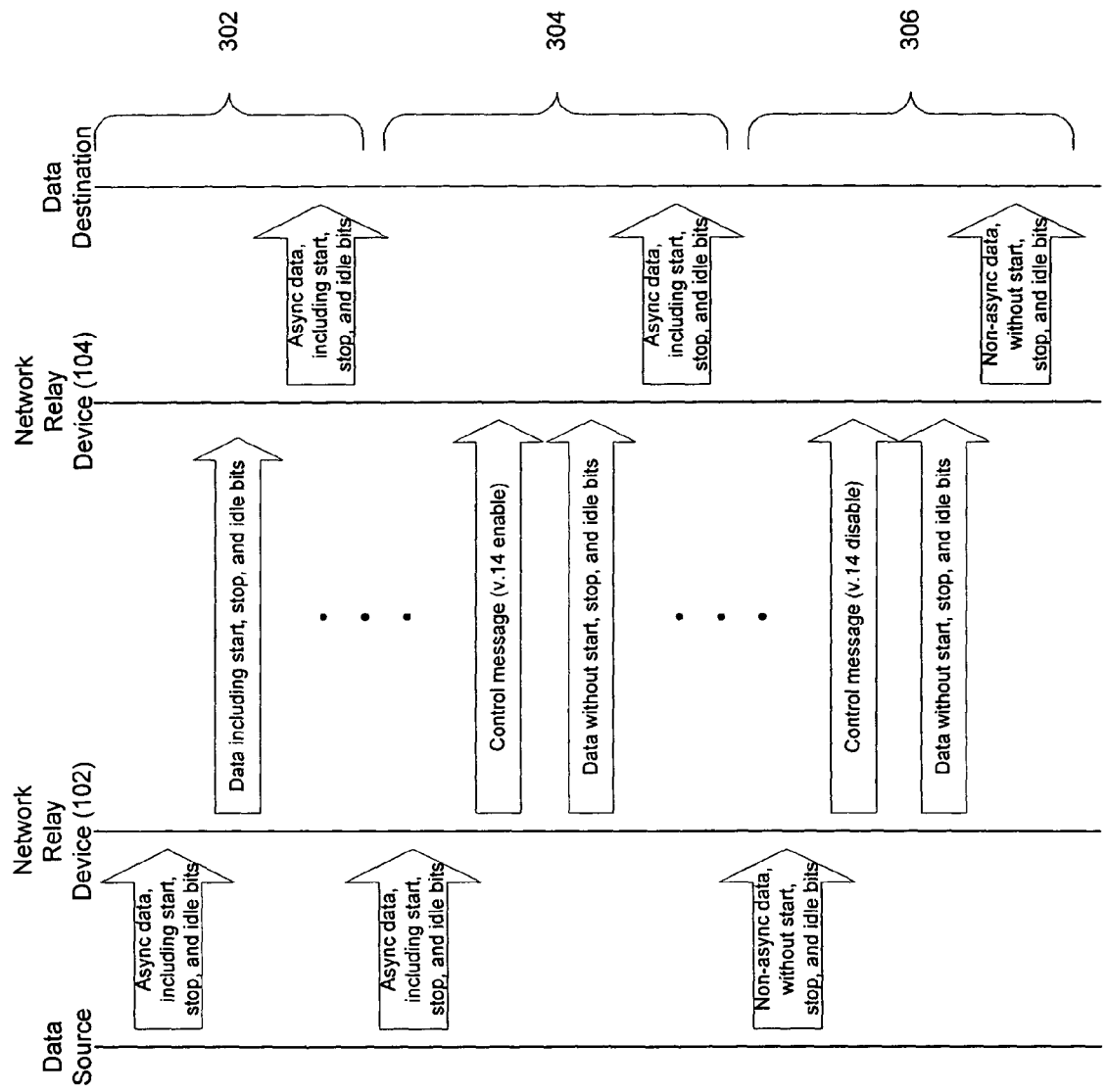
FIG. 3 is a flow diagram depicting illustrative flows for automatic detection and processing of asynchronous data for bandwidth reduction, in accordance with one embodiment of the present invention.

FIG. 3 is a flow diagram depicting illustrative flows for automatic detection and processing of asynchronous data for bandwidth reduction, in accordance with one embodiment of the present invention. Again, for clarity of illustration, the figure depicts flows associated with data travel in one direction. Flows of data travel in an opposite direction may be similarly implemented.

First, an illustrative flow 302 shows processing of asynchronous data containing synchronization characters, before detection of the asynchronous mode. As shown, asynchronous data including start bits, stop bits, and idle bits, are sent from a data source to network relay device 102. The data source may be, for instance, data communication device 112. At this point, network relay device has not detected the asynchronous mode. Thus, network relay device 102 simply forwards the asynchronous data, including start bits, stop bits, and idle bits, over the relevant network to network relay device 104. Network relay device 104 forwards the asynchronous data to the data destination. The data destination may be, for instance, data communication device 122. Although not specifically shown, modulated signals may be used as mentioned previously.

Flow 302 demonstrates the operation of a system such as system 100 while an attempt is made to detect an asynchronous mode. Thus, as network relay device 102 attempts to detect an asynchronous mode, network relay device 102 does not interrupt the flow of data toward network relay device 104. Instead, network relay device 102 continues to forward asynchronous data, including start bits, stop bits, and idle bits, to network relay device 104 as the detection algorithm operates in attempting to detect an asynchronous mode. This minimizes disruption to the flow of data.

Second, an illustrative flow 304 shows processing of asynchronous data containing synchronization characters, upon detection of the asynchronous mode. When an asynchronous mode is detected, network relay device 102 inserts a control message into the data forwarded to network relay device 104. This control message indicates to network relay device 104 that an asynchronous mode has been detected. Network relay device 102 also extracts the start bits, stop bits, and idle bits from the asynchronous data. The resulting bandwidth-reduced data stream thus contains the control message and the data, with synchronization characters removed. Network relay device 102 forwards the bandwidth-reduced data stream over the relevant network to network relay device 104.

Upon receiving the control message in flow 304, network relay device 104 enables its V.14 encoder capabilities. This allows network relay device 104 to re-insert appropriate start bits, stop bits, and idle bits back into the data stream it receives from over the network. The result is a reconstituted data stream that resembles the original asynchronous data and includes the appropriate start bits, stop bits, and idle bits. Network relay device 104 forwards the reconstituted data stream to the data destination.

Finally, an illustrative flow 306 shows processing of non-asynchronous data, which does not contain synchronization characters, upon loss of detection of the asynchronous mode. As shown in flow 306, the data from the data source may become non-asynchronous data. That is, the data may no longer contain start bits, stop bits, and idle bits at locations consistent with the relevant V.14 asynchronous mode characteristics. Network relay device 102 can sense this and declare loss of detection of the asynchronous mode.

Specifically, as network relay device 102 operates, it continually detects for the asynchronous mode. For example, V.14 encoder/decoder module 119 may continually decode V.14 asynchronous data by examining bit positions to determine if start bits, stop bits, and idle bits are present at locations consistent with the relevant V.14 asynchronous mode characteristics. When sufficient deviations from such asynchronous mode characteristics are detected, a loss of detection of the asynchronous mode may be declared. For instance, if the number of consecutive V.14 frames detected falls below a predetermined number, loss of detection of the asynchronous mode may be declared.

When loss of detection of asynchronous mode occurs, network relay device 102 inserts a control message into the data forwarded to network relay device 104. This control message indicates to network relay device 104 that detection of asynchronous mode has been lost. Network relay device 102 also stops extracting any start bits, stop bits, and idle bits from the data. Indeed, once asynchronous mode is no longer detected, network relay device 102 cannot be sure that start bits, stop bits, and idles bits even exist in the data. Thus, network relay device simply forwards the non-asynchronous data to network relay device 104, without extracting any synchronization characters.

Upon receiving the control message in flow 306, network relay device 106 disables its V.14 encoder capabilities. This stops the insertion of any start bits, stop bits, and idle bits into the data stream received by network relay device 104 from over the network. The result is a data stream that resembles the original non-asynchronous data. Network relay device 104 forwards the non-asynchronous data stream to the data destination.

Process Flow Chart

Figure 4:
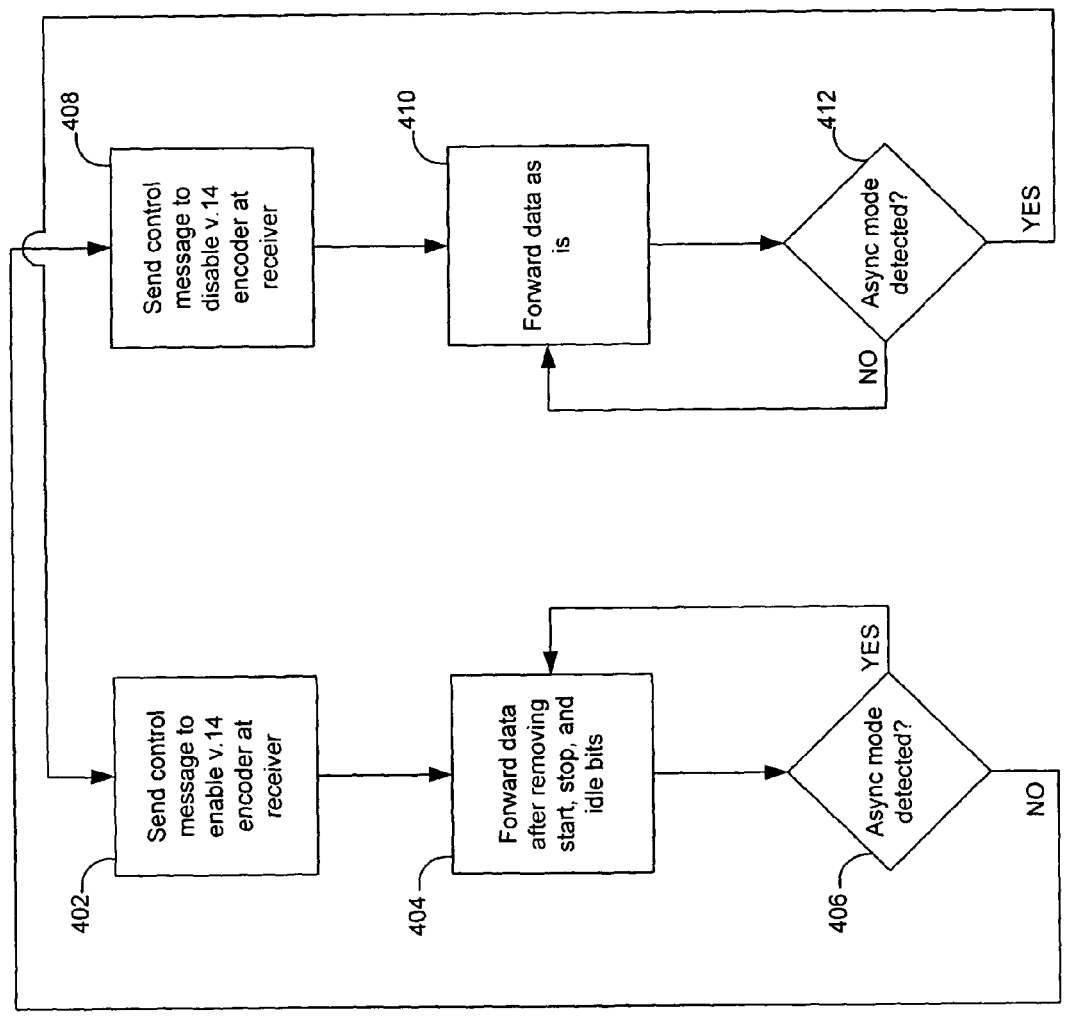
FIG. 4 is a flow chart depicting illustrative steps for automatic detection and processing of asynchronous data for bandwidth reduction, in accordance with one embodiment of the present invention.

FIG. 4 is a flow chart depicting illustrative steps for automatic detection and processing of asynchronous data for bandwidth reduction, in accordance with one embodiment of the present invention. Again, for clarity of illustration, the figure depicts processing associated with data travel in one direction. Processing for data travel in another direction may be similarly implemented.

In step 402, a control message is sent from the transmitter to the receiver to enable the V.14 encoder at the receiver. Here, the transmitter may be network relay device 102, and the receiver may be network relay device 104. This control message indicates to the receiver that the transmitter has detected asynchronous mode and has acted to remove synchronization characters such as start bits, stop bits, and idle bits. Thus, the control message instructs the receiver to re-insert appropriate synchronization characters, as they may be needed by the equipment downstream. Step 402 is followed by step 404.

In step 404, data is processed at the transmitter to remove synchronization characters, such as start bits, stop bits, and idle bits. The processed data is then forwarded over the network to the receiver. Step 404 is followed by step 406.

In step 406, a determination is made as to whether asynchronous mode is detected. If so, the process returns to step 404. If not, the process moves to step 408. Detection of an asynchronous mode may be performed using techniques such as those described previously.

In step 408, a control message is sent from the transmitter to the receiver to disable the V.14 encoder at the receiver. This control message indicates to the receiver that the transmitter has loss detection of asynchronous mode and has stopped the removal of synchronization characters such as start bits, stop bits, and idle bits. Thus, the control message instructs the receiver to stop re-insert appropriate synchronization characters. Step 408 is followed by step 410.

In step 410, data is forwarded "as is" from the transmitter to the receiver over the network. That is, the transmitter does not process the data to remove any synchronization characters before forwarding. Step 410 is followed by step 412.

In step 412, a determination is made as to whether asynchronous mode is detected. If so, the process returns to step 410. If not, the process moves to step 402. Again, detection of an asynchronous mode may be performed using techniques such as those described previously.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for relaying data from a first network device to a second network device over a communications network comprising:

obtaining a data stream from a data source at the first network device, the data stream having a first data format and comprising a bi-directional communication call;

forwarding the obtained data stream in the first data format over the network;

while forwarding the obtained data stream in the first data format over the network, monitoring the obtained data stream in the first data format at the first network device to detect a data transfer mode associated with inclusion of synchronization characters in the obtained data stream without interrupting the obtained data stream in the first data format from flowing toward the second network device;

removing, at the first network device, a plurality of synchronization characters from the obtained data stream in the first data format to produce a bandwidth-reduced data stream having a second data format different from the first data format and forwarding the bandwidth-reduced data stream to the second network device instead of the obtained data stream in response to detecting the data transfer mode;

in response to determining that detection of a data transfer mode associated with inclusion of synchronization characters has ceased, sending a control message to the second network device, wherein the control message indicates the determination that detection of a data transfer mode associated with inclusion of synchronization characters has ceased; and wherein receipt of the control message by the second network device causes the second network device to cease insertion, into the bandwidth-reduced data stream, of the synchronization characters that the first network device had removed from the obtained data stream.

2. The method of claim 1 further comprising the step of sending a first control message from the first network device to the second network device, if the data transfer mode is detected.

3. The method of claim 2 further comprising the steps of sending a second control message and forwarding the obtained data stream in the first data format from the first network device to the second network device instead of the bandwidth-reduced data stream in the second data format, if the data transfer mode is no longer detected.

4. The method of claim 3 wherein the first control message and second control message are included as part of data streams forwarded over the network.

5. The method of claim 2 further comprising means for forwarding the obtained data stream in the first data format over the network instead of the bandwidth-reduced data stream in the second data format, if the data transfer mode associated with inclusion of synchronization characters is no longer detected.

6. The method of claim 5 wherein the data transfer mode associated with inclusion of synchronization characters is an asynchronous data transfer mode.

7. The method of claim 6 wherein the asynchronous data transfer mode is based on a V.14 standard.

8. The method of claim 7 wherein the asynchronous data transfer mode is detected by decoding a predetermined number of valid V.14 frames from the obtained data stream.

9. The method of claim 1 wherein the synchronization characters comprise start bits, stop bits, and idle bits.

10. The method of claim 1 wherein the data transfer mode associated with inclusion of synchronization characters is an asynchronous data transfer mode.

11. The method of claim 10 wherein the asynchronous data transfer mode is based on a V.14 standard.

12. The method of claim 11 wherein the asynchronous data transfer mode is detected by decoding a predetermined number of valid V.14 frames from the obtained data stream.

13. An apparatus for relaying data comprising:
an interface module for receiving an obtained data stream from a data source, the obtained data stream having a first data format and comprising a bi-directional communication call;
a switcher module coupled to the interface module and configured to direct the obtained data stream in the first format for forwarding over a network;
a decoder module associated with the switcher module and configured to forward the obtained data stream in the first format and while monitoring the obtained data stream to detect a data transfer mode associated with inclusion of synchronization characters in the obtained data stream without interrupting the forwarding of the obtained data stream in the first format over the network;
wherein the decoder module is further configured to remove a plurality of synchronization characters from the obtained data stream to produce a bandwidth-reduced data stream having a second data format different from the first data format in response to detecting the data transfer mode;
wherein the switcher module is further configured to direct the bandwidth-reduced data stream in the second format instead of the obtained data stream for forwarding over the network;
wherein the decoder module is further configured to, in response to determining that detection of a data transfer mode associated with inclusion of synchronization characters has ceased, send a control message to a second network device, wherein the control message indicates the determination that detection of a data transfer mode associated with inclusion of synchronization characters has ceased; and
wherein receipt of the control message by the second network device causes the second network device to cease insertion, into the bandwidth-reduced data stream, of the synchronization characters that the decoder module had removed from the obtained data stream.

14. The apparatus of claim 13 wherein the switcher module is further configured to send a first control message, if the data transfer mode is detected.

15. The apparatus of claim 14 wherein the switcher module is further configured to send a second control message and to direct forwarding of the obtained data stream in the first data format instead of the bandwidth-reduced data stream in the second data format for forwarding over the network, if the data transfer mode is no longer detected.

16. The apparatus of claim 13 wherein the synchronization characters comprise start bits, stop bits, and idle bits.

17. The apparatus of claim 13 wherein the data transfer mode is an asynchronous data transfer mode based on a V.14 standard.

18. A system for relaying data comprising:
means for obtaining a data stream in a first data format and comprising a bi-directional communication call from a data source;
means for forwarding the obtained data stream in the first data format over a network;
means for while forwarding the obtained data stream in the first data format over the network, monitoring the obtained data stream in the first data format to detect a data transfer mode associated with inclusion of synchronization characters in the obtained data stream without interrupting the forwarding of the obtained data stream in the first data format over the network;
means for, if the data transfer mode is detected, then removing a plurality of synchronization characters from the obtained data stream to produce a bandwidth-reduced data stream having a second data format different from the first data format and forwarding the bandwidth-reduced data stream instead of the obtained data stream over the network in response to detecting the data transfer mode;

means for, in response to determining that detection of a data transfer mode associated with inclusion of synchronization characters has ceased, sending a control message to a second network device, wherein the control message indicates the determination that detection of a data transfer mode associated with inclusion of synchronization characters has ceased; and wherein receipt of the control message by the second network device causes the second network device to cease insertion, into the bandwidth-reduced data stream, of the synchronization characters that the means for removing had removed from the obtained data stream.

* * * * *